(12) United States Patent
Skalleberg

(10) Patent No.: US 8,398,013 B2
(45) Date of Patent: Mar. 19, 2013

(54) CABLE REEL DEVICE

(75) Inventor: Oystein Skalleberg, Nyhamnslage (SE)

(73) Assignee: Skaltek AB, Kungsangen (SE)

( * ) Notice: Subject to any disclaimer, the term of this patent is extended or adjusted under 35 U.S.C. 154(b) by 333 days.

(21) Appl. No.: 12/739,992

(22) PCT Filed: Nov. 3, 2008

(86) PCT No.: PCT/SE2008/051244
§ 371 (c)(1),
(2), (4) Date: Apr. 27, 2010

(87) PCT Pub. No.: WO2009/061266
PCT Pub. Date: May 14, 2009

(65) Prior Publication Data
US 2010/0243787 A1 Sep. 30, 2010

(30) Foreign Application Priority Data
Nov. 6, 2007 (SE) .................................... 0702448

(51) Int. Cl.
*B65H 54/42* (2006.01)
(52) U.S. Cl. .................. 242/486.2; 242/393; 242/595.1
(58) Field of Classification Search .................. 242/595, 242/595.1, 485.9, 486.2, 393, 398, 399, 403
See application file for complete search history.

(56) References Cited

U.S. PATENT DOCUMENTS

| | | | |
|---|---|---|---|
| 2,904,273 A | 10/1957 | Turner, Jr. | |
| 3,103,322 A | 9/1963 | Garner | |
| 4,085,904 A | 4/1978 | McElroy | |
| 4,454,999 A | 6/1984 | Woodruff | |
| 4,781,335 A | 11/1988 | Compagnon | |
| 6,494,397 B1 * | 12/2002 | Myklebust | 242/399.1 |

OTHER PUBLICATIONS

International Preliminary Report on Patentability, corresponding to PCT/SE2008/051244, issuance of this report May 11, 2010.
International Search Report corresponding to PCT/SE2008/051244, mailed on Jan. 23, 2009.
Written Opinion corresponding to PCT/SE2008/051244, mailed on Jan. 23, 2009.

* cited by examiner

*Primary Examiner* — William E Dondero
(74) *Attorney, Agent, or Firm* — Renner, Otto, Boisselle & Sklar, LLP

(57) ABSTRACT

The invention relates to a cable reel device, comprising a rack on which the cable reel is rotatable mounted. The cable reel is provided with a portion for storing cable, wire or the like, as well as flanges on either side of the portion. The device comprises a machine which is provided with at least two drive wheels. The rack with the cable reel can be placed in the machine so that the rack and the cable reel rest on the machine, so that the flanges of the cable reel are in contact with the drive wheels.

9 Claims, 5 Drawing Sheets

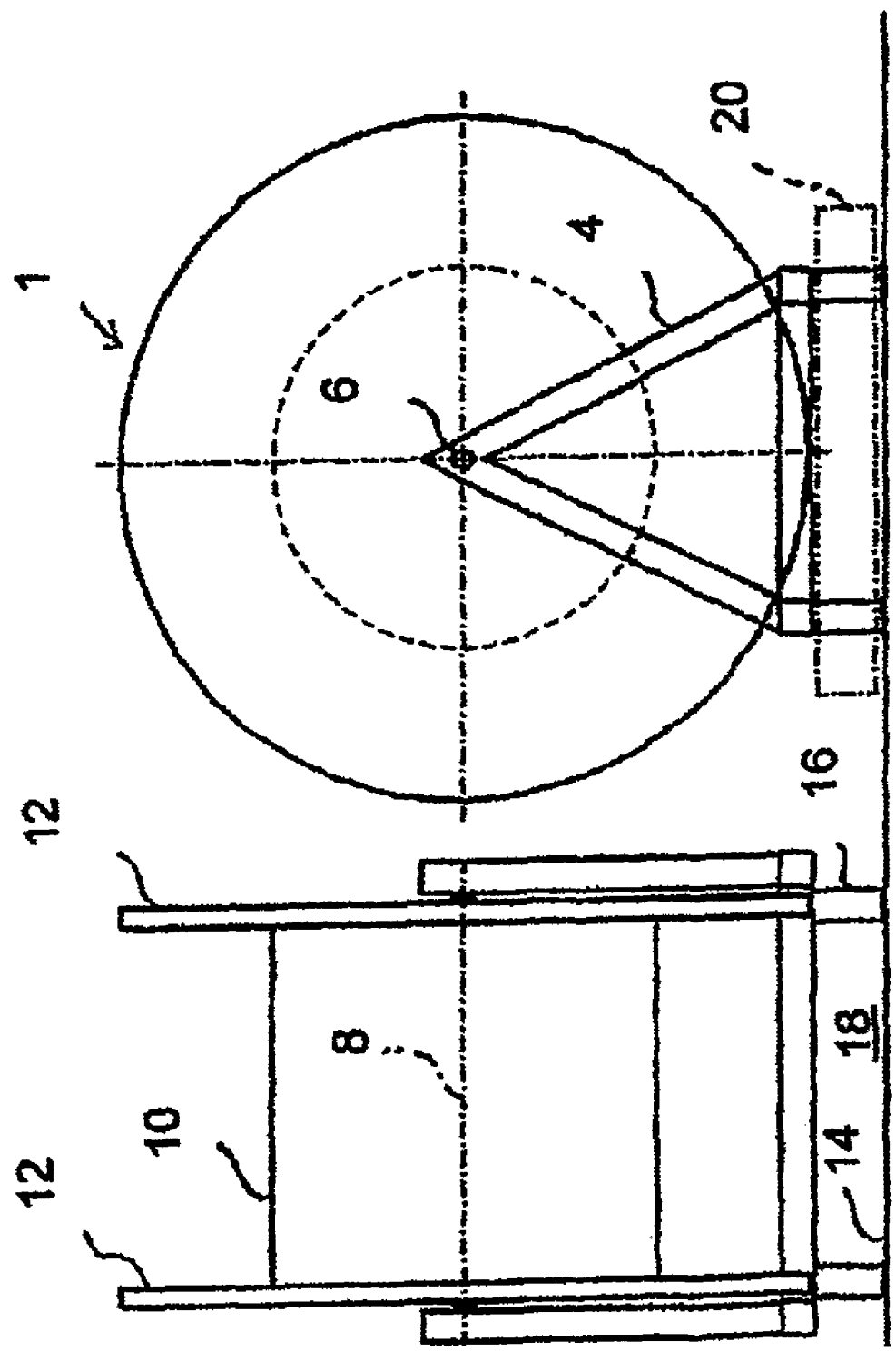

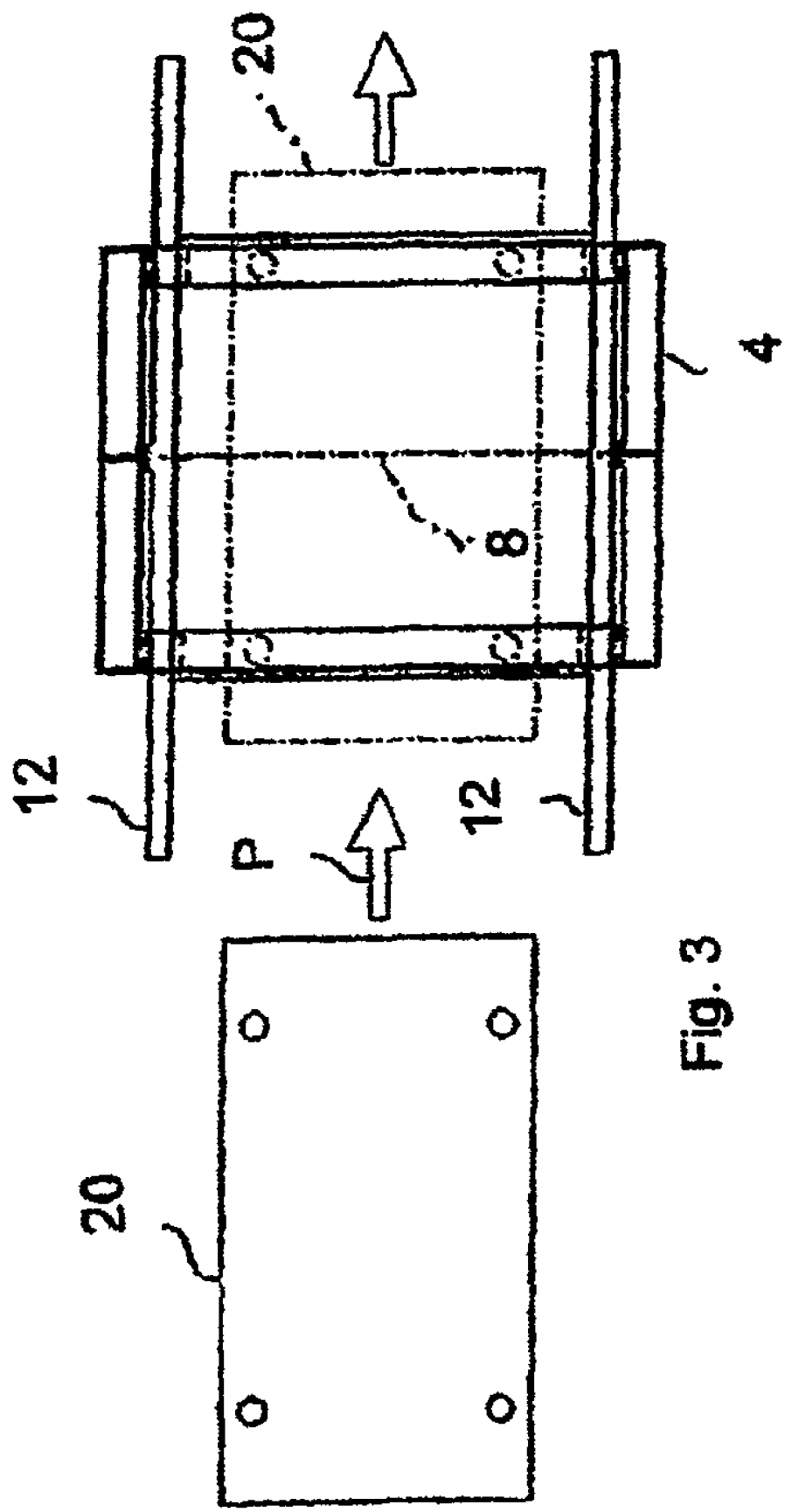

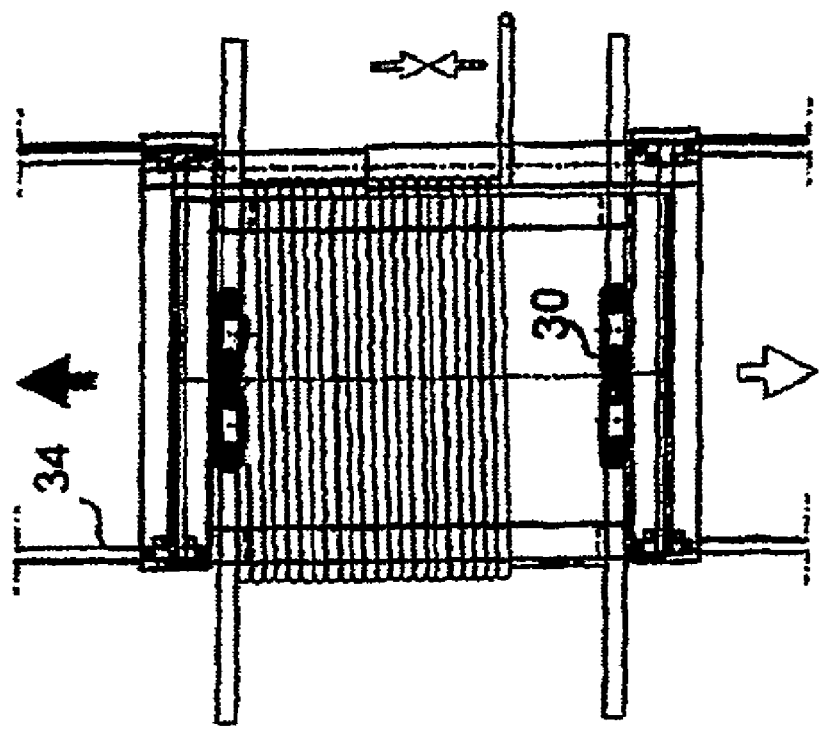
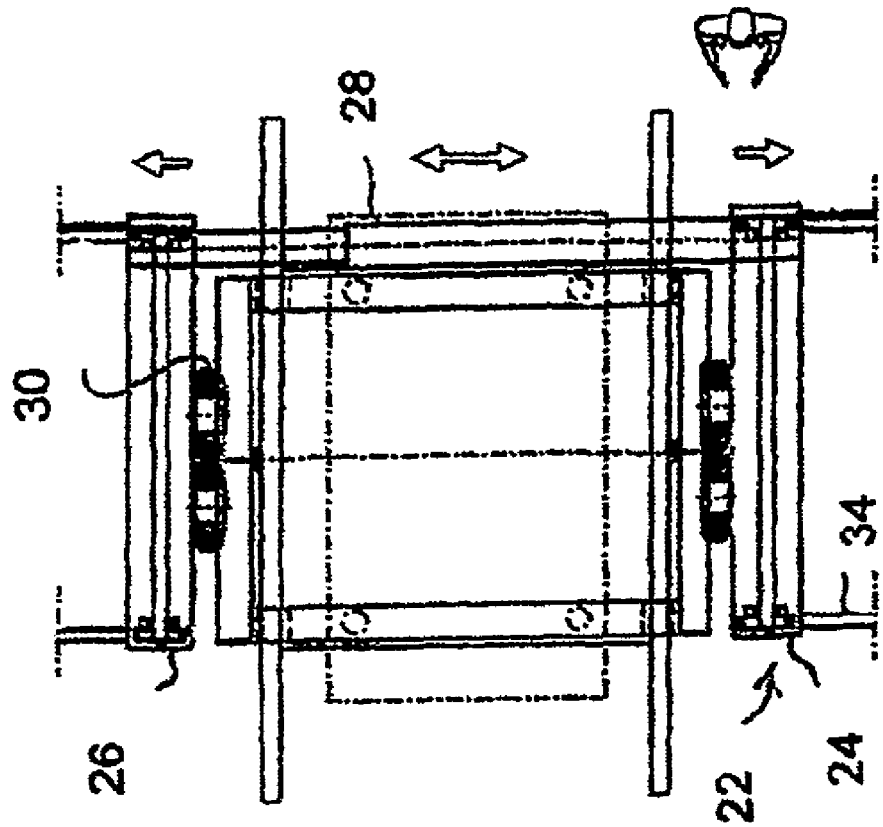

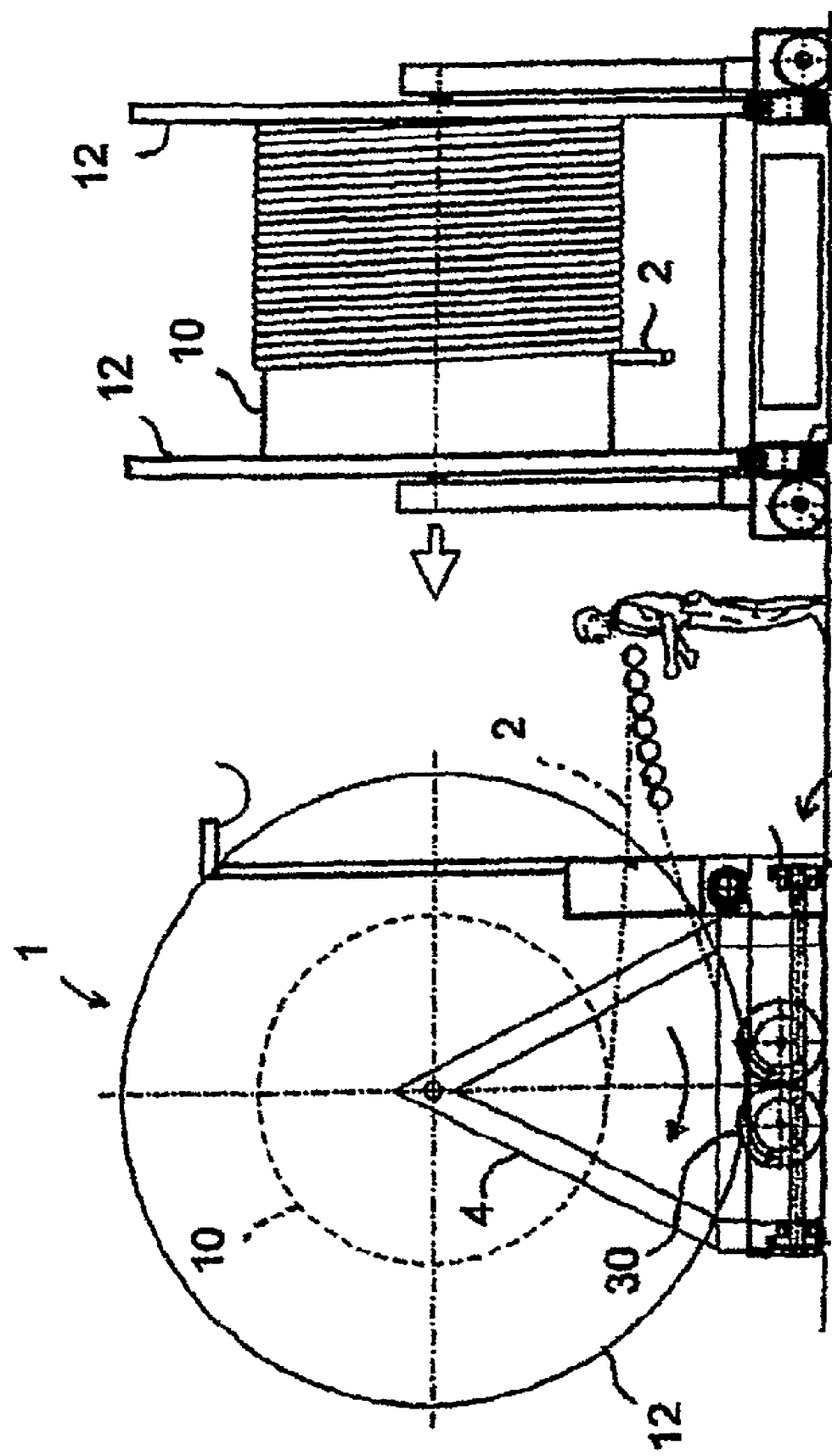

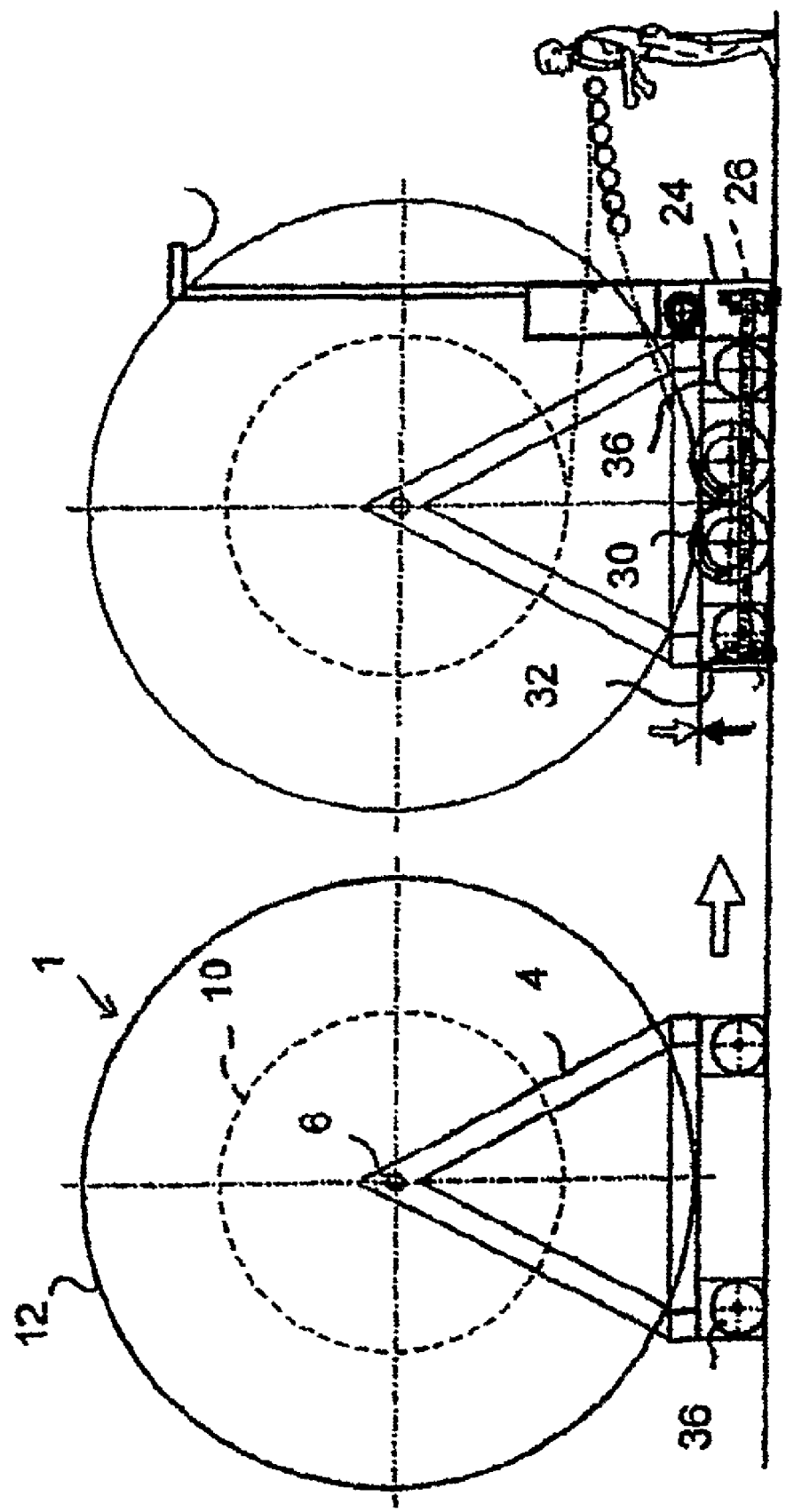

CABLE REEL DEVICE

The present invention relates to a cable reel device.

Cable reels or cable drums are used for reeling up, storing and reeling out cable, wire or the like. Cable reels or drums are normally placed on the floor and are then only intended for storing of cable. Cable reels are sometimes placed on a pallet to prevent the reel from rotating and the reel with pallet is then a transport module. It is known to place a reel in a rack which ports the cable reel by means of a shaft which extends to the centre axis of the cable reel. The cable reel is thus rotatable mounted on the shaft of the rack.

Cable reels are available in various sizes adapted to the size and length of the cable, wire or the like which is to be stored on the cable reel. Cable reels with a diameter exceeding several meters are often difficult to handle, specially when they are to be moved between various locations or various work stations for reeling up, storage and reeling out of cable, wire or the like.

The known devices available for handling and transporting cable reels are often complex and often require careful and time-consuming adjustment to place the cable reel at a work station.

The purpose of the present invention is to eliminate the disadvantages associated with the known technology and to achieve a cable reel device which is simple, cost saving and reliable, and which functions in a complete system with a transport device and a reeling up and reeling out device.

This is achieved with a device of the type described by way of the introduction which has the characteristics disclosed in this application.

Such a cable reel device will be both simple and reliable due to the relatively few components used to handle the cable reel. The device will thus also be cost effective in comparison with known devices.

The invention will be described in more detail in the following with the aid of the example shown in the accompanying drawings, of which:

FIG. 1 shows a side view of a first embodiment of a device according to the present invention, FIG. 2 shows a side view of the device according to the first embodiment, FIG. 3 shows a view from above of the device according to the first embodiment, FIG. 4 shows a view from above of the device according to the first embodiment, FIG. 5 shows a view from above of the device according to the first embodiment, FIG. 6 shows a side view of the device according to the first embodiment, FIG. 7 shows a side view of the device according to the first embodiment, FIG. 8 shows a side view of a second embodiment of a device according to the present invention, and FIG. 9 shows a side view of the device according to FIG. 8.

FIG. 1 shows a side view of a device according to present invention according to a first embodiment. The device comprises a cable reel or drum 1 which is intended to be used for reeling in, storage, and reeling out of cable 2, wire or the like. The cable reel 1 is placed in a rack 4 which supports the cable reel 1 by means of a shaft 6. FIG. 2 is a side view of the device as seen in a view 90° turned relative to FIG. 1. It can be seen in FIG. 2 that the shaft 6 of the rack 4 extends to the centre axis 8 of the cable reel 1. The cable reel 1 is thus rotatable mounted on the shaft 6 of the rack 4.

The cable reel 1 comprises a substantially circular portion 10 on which cable 2, wire or the like rest. On each side of the essentially circular portion 10 there are two substantially circular flanges 12. The rack 4 rests on a floor surface 14 and the rack 4 carries the cable reel 1 so that the flanges 12 are spaced above the floor surface 14, so that the cable reel 1 can rotates freely about its centre axis 8.

According to the first embodiment of the invention, the rack 4 is provided with legs 16, which rest on the floor surface 14 and which form a space 18 under the rack 4 for a transport unit 20, which can be moved into or out of the space 18. The transport unit 20 is adapted to be able to lift the rack 4 so that the legs 16 will be spaced above the floor surface 14, which means that the rack 4 and the cable reel 1 can be moved over the floor surface 14 with the aid of the transport unit 20. The transport unit 20 is preferably designed so that it does not come into contact with the cable reel 1. This avoids deformation of the cable reel 1.

The transport unit 20 can be provided with air-cushions, hydraulic or pneumatic cylinders or the like (not shown) to lift the rack 4 and the cable reel 1 from the floor surface 14. Rollers, air-cushions or the like (not shown) on the transport unit 20 make it possible for the transport unit 20 to be moved laterally over the floor surface 14.

FIG. 3 shows in a view from above how the transport unit 20 can be moved under the rack 4 and the cable reel 1. The arrow P in FIG. 3 represents movement of the transport unit 20 from a position to the left of the rack 4 in FIG. 3 to a position under the rack 4 as showed to the right in FIG. 3.

FIG. 4 shows in a view from above how the transport unit 20 has moved the rack 4 and the cable reel 1 to a machine 22 for reeling up and reeling out cable 2, wire or the like. The machine 22 comprises a first base unit 24 and a second base unit 26 which are joined to each other by means of a telescoping shaft 28.

Each base unit 24, 26 is provided with at least one drive wheel 30 for rotation of the cable reel 1. Each drive wheel 30 is intended to be in contact with the respective flange 12 of the cable reel 1. Preferable two drive wheels 30 are arranged on each base unit 24, 26, so as to provide reliable contact between the drive wheels 30 and the flanges 12 of the cable reel.

The telescoping shaft 28 orients and fixes the base units 24, 26 in relation to each other, so that they can be placed at a first spacing from each other which is adapted for insertion and extraction of the rack 4 with the cable reel 1 and the transport unit 20 between the base units 24, 26. FIG. 4 shows when the base units 24, 26 are at the first spacing from each other. The transport unit 20 then lifts the rack 4 with the cable reel 1 high enough so that the flanges 12 of the cable reel 1 are above the drive wheels 30. When the transport unit 20 has moved the rack 4 and the cable reel 1 to this position between the base units 24, 26, the base units 24, 26 are displaced to each other and till they reach a second space in relation to each other. This second spacing is adapted to the dimensions of the cable reel 1 so that the drive wheel 30 will be under the respective flanges 12 of the cable reel 1. When the base unit 24, 26 have been moved to the second spacing in relation to each other, the base units 24, 26 are fixed to each other and the transport unit 20 lowers the rack 4 and the cable reel 1 so that the rack 4 with the cable reel 1 rests on the base units 24, 26 so that the flanges 12 of the cable reel 1 rest with suitable contact against the drive wheels 30. The transport unit 20 can thereafter be moved from the rack 4 and the machine 22. When the flanges 12 of the cable reel 1 lie on the drive wheels 30, the legs 16 of the rack 4 are spaced above the floor surface 14.

FIG. 5 shows in a view from above when the base units 24, 26 are at the second spacing from each other and when the cable reel 1 rests with its flanges 12 on the drive wheels 30.

This is also shown in a side view in FIG. 6 and in a side view in FIG. 7, which is rotated in 90° in relation to FIG. 6.

The base units 24, 26 are provided with wheels 32, which run on rails 34 on the floor surface 14. This allows the machine 22 to be moved back and forth essentially parallel to the centre axis 8 of the cable reel 1. This back and forth movement is necessary to distribute the cable 2, wire or the like evenly over the portion 10 of the cable reel 1 when reeling up and reeling out the cable.

Reeling up and reeling out the cable 2, wire or the like is accomplish by a drive means (not shown) coupled to the drive wheels 30 rotating the drive wheels 30, so that the rotation of the drive wheels 30 drives the cable reel 1, which does rotates essentially about its centre axis 8. Depending on the rotation of direction of the drive wheels 30, the cable reel 1 will rotate in the first or second direction, said rotation of direction causing the cable 2, wire or the like to be either reeled up or reeled out from the cable reel 1. When reeling out, the drive wheels 30 can function as a brake to exert a suitable tense of force on the cable 2, wire or the like.

When the cable 2, wire or the like has been reeled up and/or reeled out from the cable reel 1, the reversed process is carried out to remove the rack 4 with the cable reel 1 from the machine 22 by using the transport unit 20 in the reversed order.

FIG. 8 shows a side view of a device according to a second embodiment of the present invention. According to the second embodiment, the rack 4 is provided with support wheels 36 resting on the floor surface 14. The support wheels 36 permit the rack 4, and thus the cable reel 1 to be moved over the floor surface 14 with the support wheels 36 rolling on the floor surface 14. A transport unit 20 according to the first embodiment is thus not necessary in the second embodiment.

FIG. 9 shows in a side view how the rack 4 and the cable reel 1 have been rolled in between two base units 24, 26. In order to displace the base units 24, 26 towards each other so that they are at the second space in relation to each other, the respective base units 24, 26 are forced lowered when they are at the first space in relation to each other towards the floor surface 14 so that the drive wheels 30 are at a level below the flanges 12 of the cable reel 1. The base units 24, 26 are then displaced towards each other until the drive wheels 30 are placed under the respective flanges 12 of the cable reel 1. When the base units 24, 25 have reached this second space in relation to each other, the base units 24, 25 and thus the drive wheels 30 are raised so that the rack 4 with the cable reel 1 rest on the base units 24, 26 so that the flanges 12 of the cable reel 1 rest with suitable contact against the drive wheels 30. The base units 24, 25 are raised so much that the support wheels 36 of the rack 4 will be spaced above the floor surface 14. The cable 2, wire or the like can now, in a manner as described in relation to the first embodiment, now be reeled up and/or reeled out from the cable reel 1.

When the cable 2, wire or the like has been reeled in and/or reeled out from the cable reel 1, the reversed process takes place to remove the rack 4 with the cable reel 1 from the machine 22.

The invention claimed is:

1. Cable reel device comprising a cable storage portion for storage of cable or wire including flanges on either side of the cable storage portion, said cable reel device further comprising:
    a machine with two base units which are displaceable relatively to each other to adapt the machine to the size of the cable storage portion;
        said machine comprising at least two drive wheels, wherein the cable reel device includes a rack on which the cable storage portion is rotatably mounted;
        the base units being displaceable relative to each other to adapt the machine to the size of the rack;
        the rack with the cable storage portion being placeable in the machine so that the rack rests on the base unit and the flanges rest on the drive wheels.

2. Device according to claim 1, wherein each base unit comprises one or two drive wheels, which are adapted to achieve a rotation of the cable storage portion.

3. Device according to claim 2, wherein the first and second base units are joined to each other by means of a telescoping shaft.

4. Device according to claim 1, wherein a transport unit is adapted to place the rack with the cable storage portion in the machine.

5. Device according to claim 4, wherein the transport unit is adapted to raise and lift the rack with the cable storage portion, so that the flanges of the cable storage portion can be placed on the drive wheels.

6. Device according to claim 1, wherein the rack is provided with support wheels to place the rack with the cable storage portion in the machine.

7. Device according to claim 1, wherein the machine can be raised and lowered to place the flanges of the cable storage portion on the drive wheels.

8. Device according to claim 1, wherein the machine includes wheels, which are adapted to roll on rails in a direction substantially parallel to a center axis of the cable storage portion.

9. Method of reeling in a cable with a device according to claim 1, comprising the steps of:
    transporting a rack with a cable storage portion to a machine, comprising first and second base units, each of which is provided with at least one drive wheel;
    displacing the base units so that the drive wheels are under the respective flanges at the cable storage portion;
    the rack in the machine so that the rack rests on the base units and so that the flanges of the cable storage portion rest on the drive wheels; and
    rotating the cable storage portion by means of the drive wheels to reel up the cable on the cable storage portion.

* * * * *